United States Patent
Sorrentino (10) Patent No.: US 9,906,264 B2
(45) Date of Patent: Feb. 27, 2018

(54) PROVIDING ORTHOGONALITY FOR REFERENCE SIGNALS BY CIRCULAR ROTATION OF A BASE SEQUENCE IN THE FREQUENCY DOMAIN

(71) Applicant: Telefonaktiebolaget L M Ericsson (publ), Stockholm (SE)

(72) Inventor: Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 84 days.

(21) Appl. No.: 14/786,840

(22) PCT Filed: May 8, 2013

(86) PCT No.: PCT/SE2013/050521
§ 371 (c)(1),
(2) Date: Oct. 23, 2015

(87) PCT Pub. No.: WO2014/182206
PCT Pub. Date: Nov. 13, 2014

(65) Prior Publication Data
US 2016/0119021 A1    Apr. 28, 2016

(51) Int. Cl.
*H04B 1/69* (2011.01)
*H04B 1/707* (2011.01)
*H04L 27/26* (2006.01)

(52) U.S. Cl.
CPC ......... *H04B 1/707* (2013.01); *H04L 27/2613* (2013.01); *H04B 2001/6908* (2013.01)

(58) Field of Classification Search
CPC ............ H04B 1/707; H04B 2001/6908; H04L 27/2613

USPC .................................................. 375/130, 138
See application file for complete search history.

(56) References Cited

PUBLICATIONS

Huawei et al: "Details of PUSCH DMRS for UL CoMP", 3GPP Draft; R1-120987, 3rd generation partnership project (3GPP), Mobile compentence centre; 650, Route Des Luciole; F-06921 Sophia-Antipolis Cedex; France, vol. RAN WG1, No. Jeju, Korea; 201/20326-Mar. 30, 2012. Mar. 20, 2012 (Mar. 20, 2012), XP050599299.*
Huawei et al., "R1-120987: Details of PUSCH DMRS for UL CoMP," 3rd Generation Partnership Project (3GPP), TSG RAN WG1 Meeting #68bis, Mar. 26-30, 2012, 7 pages, Jeju, Korea.
International Search Report and Written Opinion for International Patent Application No. PCT/SE2013/050521, dated Mar. 7, 2014, 6 pages.

* cited by examiner

*Primary Examiner* — Kevin M Burd
(74) *Attorney, Agent, or Firm* — Patent Portfolio Builders, PLLC (57) ABSTRACT

A first and second communication device and respective method thereby are provided for performing a radio transmission. The method performed by the first communication device comprises generating a base sequence, and replicating the base sequence per each RS panned by an OCC. The method further comprises applying, to the base sequences, an individual RS-specific circular rotation, wherein each rotated base sequence corresponds to an RS. The method also comprises multiplying each RS with a respective value of the OCC, and mapping each frequency domain RS to a subframe. Still further, the method comprises converting the subframe to a time domain; and transmitting the subframe to the second communication device.

16 Claims, 10 Drawing Sheets

PROVIDING ORTHOGONALITY FOR REFERENCE SIGNALS BY CIRCULAR ROTATION OF A BASE SEQUENCE IN THE FREQUENCY DOMAIN

This application is a 35 U.S.C. § 371 national phase filing of International Application No. PCT/SE2013/050521, filed May 8, 2013, the disclosure of which is incorporated herein by reference in its entirety.

TECHNICAL FIELD

The present disclosure relates to radio communication and in particular to a radio transmission between a first communication device and a second communication device.

BACKGROUND

In transmissions between communication devices, different types of information may be transmitted. A transmission may comprise e.g. data and control signals as well as Reference Signals, RSs. The control signals, also called control signalling, and the RSs enable the recipient of the transmission to successfully receive and decode, or demodulate, the transmission in order to retrieve the data comprised in the transmission.

In this disclosure, terminology from the $3^{rd}$ Generation Partnership Project, 3GPP, Long Term Evolution, LTE, advanced will be used to exemplify different embodiments. However, the use of terminology should not be seen as limiting to the scope of the embodiments but as exemplifications of the same. Other wireless systems, e.g. Wideband Code Division Multiple Access, WCDMA, Worldwide Interoperability for Microwave Access, WiMax, Ultra Mobile Broadband, UMB, and Global System for Mobile Communications, GSM, may also benefit from exploiting the ideas covered within this disclosure.

LTE networks are designed with the aim of enabling optional CoMP (Coordinated multipoint processing) techniques, where different sectors and/or cells operate in a coordinated way in terms of, e.g., scheduling and/or processing. An example is uplink, UL, CoMP where the signal originating from a single UE is typically received at multiple reception point and jointly processed in order to improve the link quality. UL joint processing (also referred to as UL CoMP) allows transformation of what is regarded as inter-cell interference in a traditional deployment into useful signal. Therefore, LTE networks taking advantage of UL CoMP may be deployed with smaller cell size compared to traditional deployments in order to fully take advantage of the CoMP gains. Other forms of UL CoMP are however possible, such as coordinated scheduling for cells belonging to the same CoMP coordination area (CoMP cluster). A special case of coordinated scheduling consists of assigning UE specific resources for the UL RS in order to improve interference between co-scheduled UEs, at least on the RS. LTE Release-11 introduces some features for enhanced controlled of UE specific parameters determining the UL Demodulation Reference Signal, DMRS.

The LTE UL is designed assuming coherent processing, i.e., the receiver is assumed to be able to estimate the radio channel from the transmitting user equipment, UE, and to take advantage of such information in the detection phase. Therefore, each transmitting UE sends a reference signal (RS) associated to each UL data or control channel (e.g. Physical Uplink Shared Channel, PUSCH, and Physical Uplink Control Channel, PUCCH). In case of PUSCH, one Demodulation Reference Signal, DMRS, per slot is transmitted on the same bandwidth as the uplink data channel. In case of PUCCH, multiple PUCCH-RSs are transmitted and time multiplexed by the UE within each subframe, spanning the PUCCH bandwidth assigned to the UE.

Additional RS possibly transmitted by UEs comprises Sounding Reference Signals, SRSs, i.e. signals that are transmitted by a UE at predetermined time instances and over a predetermined bandwidth, in order to enable estimation of the UL channel properties at the network side.

RSs from different UEs within the same cell potentially interfere with each other and, assuming synchronized networks, even with RS originated by UEs in neighbouring cells. As already mentioned, in order to limit the level of interference between RSs different techniques have been introduced in different LTE releases in order to allow orthogonal or semi-orthogonal RSs. The most common deployment principle of LTE assumes orthogonal RS within each cell and semi-orthogonal RS among different cells. However, orthogonality of DMRS transmitted by UEs belonging to different cell is supported for 3GPP Release-11 UEs.

Each RS is a pseudo-random signal generated in the frequency domain, enjoying some special properties that make it suitable for channel estimation. The signal corresponding to each RS is determined by a Base Sequence Index, BSI, a CS, and possibly an Orthogonal Cover Code, OCC.

A group-index and a sequence-index define the so called BSI. BSIs are assigned in a UE-specific fashion in Release-11. Different base sequences are semi-orthogonal, which implies that some inter-sequence interference is typically present. The DMRS for a given UE is only transmitted on the same bandwidth of the corresponding data signal (e.g. PUCCH, PUCCH) and the base sequence is correspondingly generated so that the RS signal is a function of the bandwidth. For each subframe, 2 RSs are transmitted, one per slot.

In order to minimise the impact of interference peaks on RSs, interference randomization techniques have been introduced in LTE. In particular, sequence hopping and group hopping (jointly referred to as SGH) are randomisation techniques which operate on a slot level. In case of SRS, SGH operates on a subframe level, since only one SRS symbol per subframe is typically generated (with the exception of certain Uplink Pilot Time Slot, UpPTS, configurations). SGH can be enabled/disabled on a cell-basis by use of the cell-specific parameters Group-hopping-enabled and Sequence-hopping-enabled, affecting respectively group hopping and sequence hopping. For 3GPP Release-10 and later UEs, SGH can be disabled in a UE specific fashion by setting the UE-specific RRC parameter Disable-sequence-group-hopping. Additionally, cyclic shift hopping, CSH, patterns provide further RS interference randomisation by applying a UE-specific pseudo-random cyclic shift, CS, per slot. According to the CSH pattern, a different CS offset may in general be applied in each slot and it is known at both UE and evolved e-Node B, eNB, sides, so that it may be compensated at the receiver side during channel estimation.

CSs are linear phase shifts applied to each BSI in the frequency domain. OCCs are orthogonal time domain codes, operating on the RSs provided for each UL subframe (OCC can be in principle applied to an arbitrary number of RSs).

Orthogonal DMRS between UEs may be achieved by use of cyclic shift, CS, if the UEs have the same bandwidth, BW, and BSI, and OCCs if the UEs do not employ sequence group hopping, SGH, and employ the same cyclic shift hopping, CSH, pattern. CS is a method to achieve orthogonality based on cyclic time shifts, under certain propagation conditions, among RS generated from the same base sequence. Only 8 different CS values may be dynamically indexed in Releases-8/9/10, even though in practice less than 8 orthogonal DMRS may be achieved depending on channel propagation properties (without considering OCC in this example). Even though CS is effective in multiplexing DMRSs assigned to fully overlapping bandwidths, orthogonality is lost when the bandwidths differ and/or when the interfering UE employs another base sequence or CSH pattern.

The OCC code [1 −1] is able to suppress an interfering DMRS as long as its contribution after the matched filter at the receiver is identical on both DMRSs of the same subframe. Similarly, the OCC code [1 1] is able to suppress an interfering DMRS as long as its contribution after the eNB matched filter has opposite sign respectively on the two RSs of the same subframe.

While base-sequences are assigned in a semi-static fashion, CS and OCC are dynamically assigned as part of the scheduling grant for each UL PUSCH transmission, for PUSCH DMRS. The CS/OCC assignment method for PUCCH DMRS is different.

Even though different implementations are possible, the typical channel estimator performs a matched filter operation of the received signal corresponding to each RS with the corresponding transmitted RS (the operation can be equivalently performed in time or frequency domains). If OCC is applied, the multiple RSs spanning the OCC code are combined according to the corresponding OCC.

CS-based orthogonality is only effective when the co-scheduled UEs are allocated the same BW, which is a serious scheduling limitation. Therefore, OCC appears as the main tool for achieving inter-UE orthogonality, since OCC is effective when the BW of the co-scheduled UEs is not fully overlapping. SGH needs to be disabled in order for OCC to be effective. Since only 2 OCC codes are available in LTE for, e.g. PUSCH DMRS, a subset of the UEs that are scheduled in the system will be assigned the first OCC code, and a subset of the UEs will be assigned the second OCC code. UEs with the same OCC code produce mutual (inter-UE) interference.

Due to SGH disabling, inter-UE interference for UEs with the same OCC code is on average 3 dB larger than for UEs with SGH enabled. This issue degrades the potential gains for RS coordination.

SUMMARY

The object is to obviate at least some of the problems outlined above. In particular, it is an object to provide a first communication device and a method performed thereby for performing a radio transmission to a second communication device as well as a second communication device and a method performed thereby for receiving a radio transmission from a first communication device.

According to an aspect a method performed by first communication device is provided. The method comprises generating a base sequence, and replicating the base sequence per each Reference Signal, RS, spanned by an Orthogonal Cover Code, OCC. The method further comprises applying, to the base sequences, an individual RS-specific circular rotation, wherein each rotated base sequence corresponds to an RS. The method also comprises multiplying each RS with a respective value of the OCC, and mapping each frequency domain RS to a subframe. Still further, the method comprises converting the subframe to a time domain; and transmitting the subframe to the second communication device.

According to an aspect a method performed by a second communication device is provided. The method comprises receiving, from the first communication device, a radio subframe comprising RSs spanned by an Orthogonal Cover Code, OCC; and converting the received subframe to a frequency domain. The method further comprises extracting RSs from the subframe; and applying, to the RSs, for an individual RS-specific circular rotation. The method also comprises combining the rotated RSs by performing a matched filter operation based on the OCC; and generating a base sequence. Still further, the method comprises multiplying, in the frequency domain, the combined RSs with a conjugate of the generated base sequence; and performing channel estimation of the multiplied and combined RSs.

According to an aspect a first communication device adapted. The first communication device comprises a generating unit adapted for generating a base sequence; and a replicating unit adapted for replicating the base sequence per each Reference Signal, RS, spanned by an Orthogonal Cover Code, OCC. The first communication device further comprises a rotating unit adapted for applying, to the base sequences, an individual RS-specific circular rotation, wherein each rotated base sequence corresponds to an RS; and a multiplying unit adapted for multiplying each RS with respective value of the OCC. Still further, the first communication device comprises a mapping unit adapted for mapping each frequency domain RS to a subframe; a converting unit adapted for converting the subframe to a time domain; and a transmitting unit adapted for transmitting the subframe to the second communication device.

According to an aspect a second communication device is provided. The second communication device comprises a receiving unit adapted for receiving, from the first communication device, a radio subframe comprising RSs spanned by an OCC; and a converting unit adapted for converting the received subframe to a frequency domain. The second communication device also comprises an extracting unit adapted for extracting Reference Signals, RSs, from the subframe; and a rotating unit adapted for applying, to the RSs, an individual RS-specific circular rotation. Further, second communication device comprises a combining unit adapted for combining the rotated RSs by performing a matched filter operation based on the OCC; and a generating unit adapted for generating a base sequence. The second communication device further comprises a multiplying unit adapted for multiplying, in the frequency domain, the combined RSs with a conjugate of the generated base sequence; and an estimating unit adapted for performing channel estimation of the multiplied and combined RSs.

BRIEF DESCRIPTION OF DRAWINGS

Embodiments will now be described in more detail in relation to the accompanying drawings, in which.

DETAILED DESCRIPTION

Briefly described, a first communication device and a method performed thereby for performing a radio transmission to a second communication device, from the first communication device are provided. Further, a second communication device and a method performed thereby for receiving a radio transmission from a first communication device are provided. According to the first and second communication device and the respective method performed thereby, a subframe is transmitted from the first to the second communication device, wherein reference signals comprised in the transmitted subframe have undergone interference randomisation.

Embodiments of a method performed by a first communication device for performing a radio transmission to a second communication device, from the first communication device will now be described with reference to FIG. 1a.

Figure 1A:
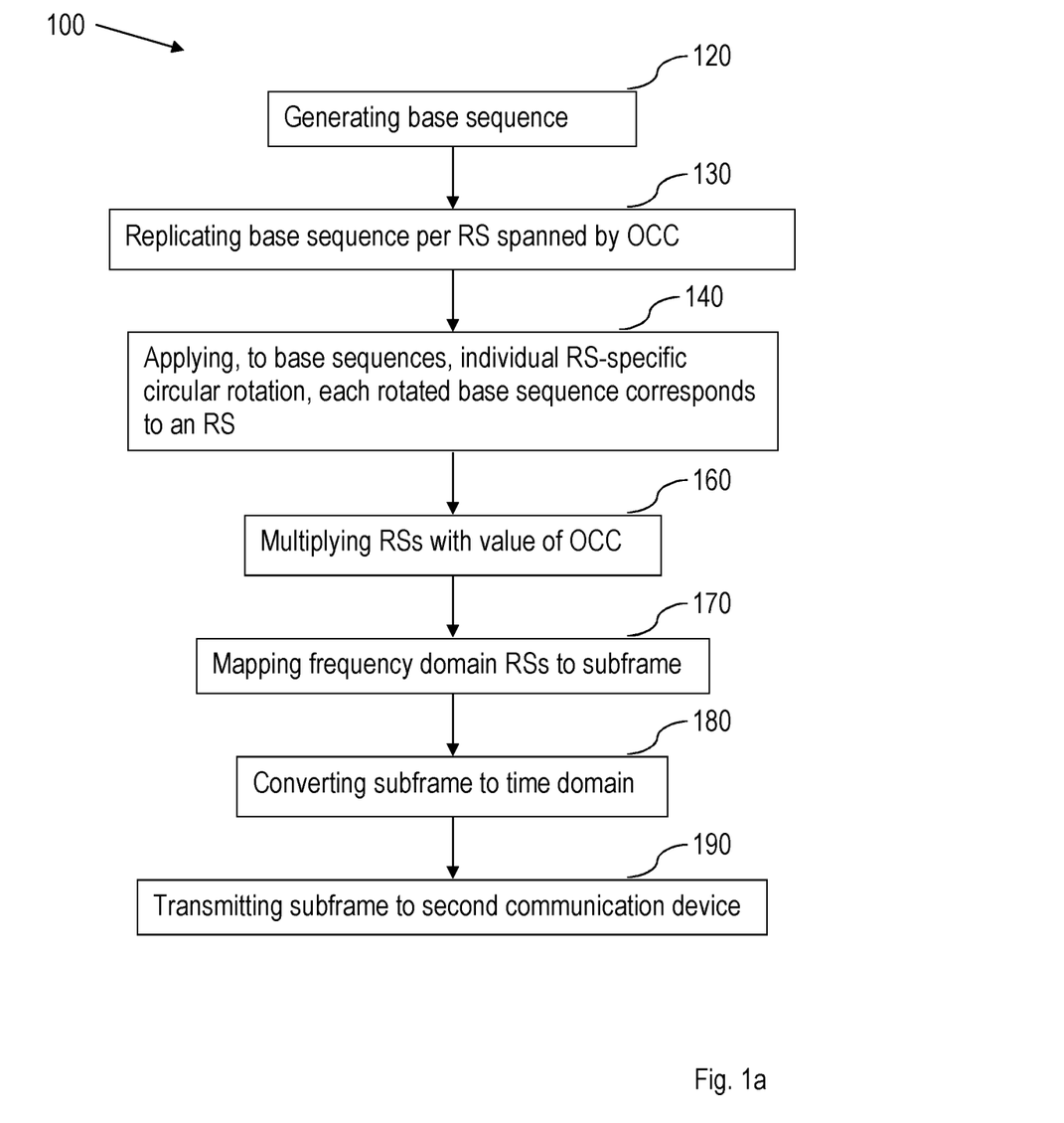
FIG. 1a is a flowchart of a method performed by a first communication according to an exemplifying embodiment.

FIG. 1a illustrates the method comprising: generating 120 a base sequence, and replicating 130 the base sequence per each Reference Signal, RS, spanned by an Orthogonal Cover Code, OCC. The method further comprises applying 140, to the base sequences, an individual RS-specific circular rotation, wherein each rotated base sequence corresponds to an RS. The method also comprises multiplying 160 each RS with a respective value of the OCC, and mapping 170 each frequency domain RS to a subframe. Still further, the method comprises converting 180 the subframe to a time domain; and transmitting 190 the subframe to the second communication device.

When the first communication device wants to transmit to the second communication device, the transmission needs to comprise RSs in order to allow the receiver to perform channel estimation and possibly coherent demodulation. The RSs may have several different purposes and there are several different RSs, e.g. Demodulation Reference Signals, DMRSs, Sounding Reference Signals, SRSs, and Channel State Information Reference Signals, CSI-RSs, just to mention a few. The transmission from the first communication to the second communication device is done my means of subframes, which comprise data, control and RSs.

To create (or generate) the RSs to be comprised in the subframe to be transmitted to the second communication device, the first communication device firstly generates a base sequence. A base sequence is defined by a group number (or index) and a sequence number (or index). In LTE, there are 30 different base sequence groups. The base sequences are denoted $\bar{r}_{u,v}(n)$. The base sequences are divided into groups, where $u \in \{0, 1, \ldots, 29\}$ is the group number and v is the base sequence number within the group, such that each group contains one base sequence (v=0) of each length $M_{sc}^{RS} = mN_{sc}^{RB}$, where $1 \leq m \leq 5$ and two base sequences (v=0, 1) each of length $M_{sc}^{RS} = mN_{sc}^{RB}$, where $6 \leq m \leq N_{RB}^{max,UL}$. In this disclosure, the set of $\{u, v\}$ is referred to as the Base Sequence Index, BSI. Consequently, the BSI determines a unique base sequence that is exploited for generation of RSs for, e.g. DMRS, PUCCH-RS and SRS. Even though the parameters that determine the sequence group number, u, and the number, v, within the group are typically assigned in a semi-static fashion, e.g. by means of RRC (Radio Resource Control) signalling, the instantaneous values of u and v may be a function of the slot index and/or subframe number. Such BSI randomisation may also be collectively referred to as sequence and/or group hopping, SGH.

In LTE UL, SGH may be enabled or disabled by means of the cell-specific parameter Group-hopping-enabled provided by higher layers. The sequence-group hopping may be disabled for certain UEs through the higher-layer parameter Disable-sequence-group-hopping despite being enabled on a cell basis.

Once the first communication device has generated the base sequence, the first communication device replicates the base sequence per each RS spanned by the OCC. In other words, if the OCC is of order 2, then the first communication device replicates the base sequence so that there are 2 identical base sequences. If the OCC is of order 4, then the first communication device replicates the base sequence so that there are 4 identical base sequences.

The method further comprises applying an individual RS-specific circular rotation to the base sequences. The individual RS-specific circular rotation is in one example individual per RS, i.e. each RS is associated with an individual RS-specific rotation which is individual for each respective RS so that there are as many individual RS-specific rotations as there are RSs. In other words, the individual RS-specific circular rotations are not all identical; at least one of individual RS-specific circular rotations is different from the others such that after the individual RS-specific circular rotations have been applied to the base sequences, the rotated base sequences are no longer identical. Each rotated base sequence corresponds to an RS. Each base sequence already corresponds to an RS, but with the RS-specific circular rotation, the RSs are not all identical. As a result, the individual RSs of the subframe are not all identical. Theoretically, in case a third communication device being in proximity with the first and the second device, also generating the same base sequence, but with different RS-specific rotation, already here the RSs of the first communication device and the RSs of the third communication device may experience reduced RS-interference from each other due to the RS-specific circular rotation.

The method also comprises multiplying 160 each RS with respective value of the OCC, and mapping 170 each frequency domain RS to a subframe. OCC of order two operates over two RS symbols transmitted in different slots. It is observed that OCC is ineffective if the same BSI is not applied in both slots, for all DMRS that need to be orthogonalised. Therefore, SGH is not compatible with inter-UE OCC orthogonality because the same BSI needs to be applied in general to both slots in order for OCC to be effective. On the other hand, SGH provides improved interference randomization as compared to repeating the same BSI in both slots. If e.g. the first and a third communication device use the same base sequence for generating the RSs, the OCC may be used on the RSs of the first and the third communication device in order to achieve orthogonality between the RSs of the first communication device and the RSs of the third communication device. Once the RSs generated by the first communication device have been multiplied with the value of OCC, then the RSs are mapped to a subframe to be transmitted to the second communication device. By this operation, the subframe will comprise the RSs and the subframe may be "filled" with the data to be transmitted in the subframe to the second communication device.

Then the subframe is transmitted to the second communication device.

The method performed by the first communication device may have several advantages. Approximately the same level of interference randomisation may be achieved as with SGH, with the advantage that OCC based orthogonality may be effectively applied.

According to an embodiment, the method further comprises generating 135 a Sequence Rotation Hopping, SRH, pattern having a length equal to the number of RSs spanned by the OCC, wherein the amount of rotation is different for at least some of the RSs, and applying 140 the RS-specific circular rotation to the base sequences is performed according to the SRH pattern.

SRH comprise of circularly shifting the BSI in the frequency domain during the RS generation process, where the amount of circular shift differs at least for some of the RS spanned by the same OCC. The RS-specific shift may be given by a pre-defined pseudo-random pattern which is known at both the transmitter and receiver. In this manner, the RSs within one subframe and also between subframes transmitted by other possibly interfering communication devices are different and interference of RSs is randomised by circular shifts in the frequency domain. SRH may be applied in conjunction with SGH and also when SGH is disabled, i.e. when the same BSI is repeated for all slots within the OCC. E.g. DMRSs with the same SRH pattern may be orthogonalised by OCC and DMRSs with different SRH pattern experience randomised interference.

Figure 1B:
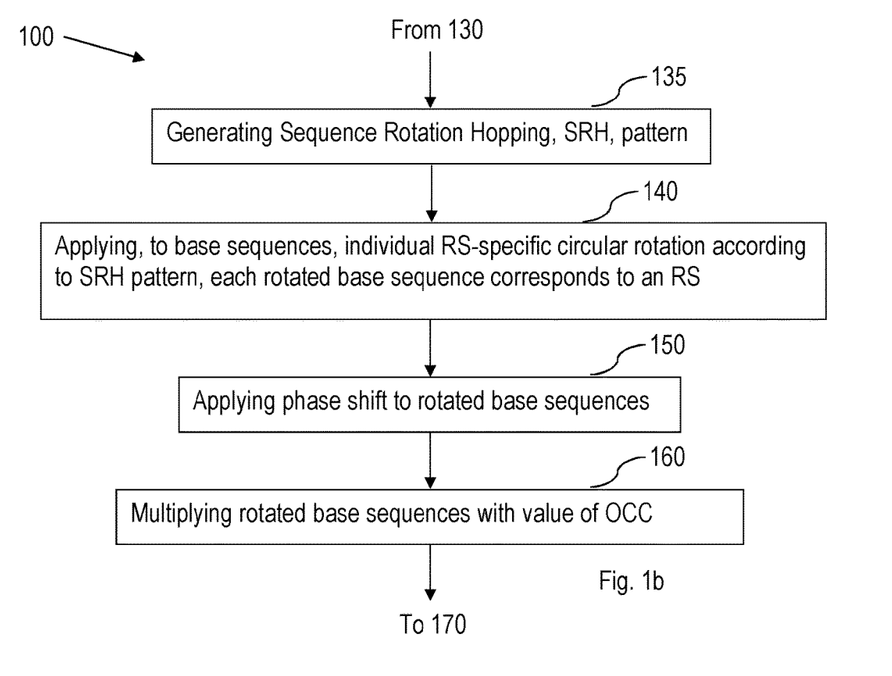
FIG. 1b is a flowchart of a method performed by a first communication device according to yet an exemplifying embodiment.

According to yet an embodiment, illustrated in FIG. 1*b*, the method further comprises applying 150 a linear phase shift to the rotated base sequences before multiplying 160 the rotated base sequences with the value of OCC.

A different linear phase shift, also known as CS offset, may in general be applied in each slot and it is known to both the first communication device and to the second communication device, so that it can be compensated for at the receiver side during channel estimation. The linear phase shift may be different for different RSs.

Figure 1C:
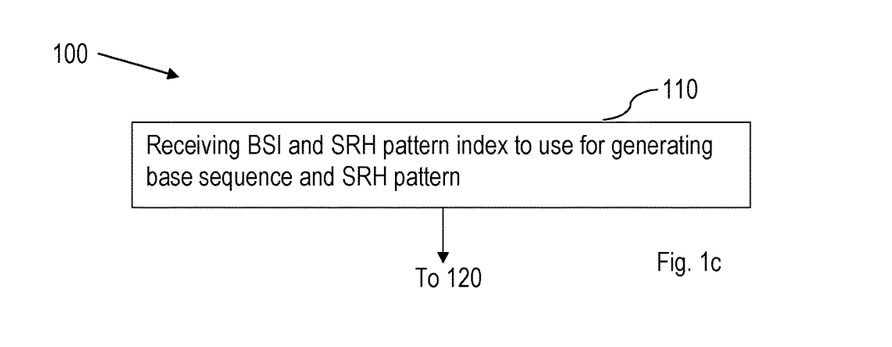
FIG. 1c is a flowchart of a method performed by a first communication device according to still an exemplifying embodiment.

According to still an embodiment, illustrated in FIG. 1*c*, the method further comprises receiving 110, from the second communication device, a Base Sequence Index, BSI, and an SRH pattern index to use for generating 120 the base sequence and for generating the SRH pattern.

As described before, both the first and the second communication device need to know e.g. the base sequence that is used for generating the RSs. This is an example of the second communication device transmitting a BSI, which index the first communication device uses in order to generate the corresponding base sequence. Likewise, the second communication device transmits an SRH pattern index to use for generating the SRH pattern.

Instead of sending or transmitting a whole base sequence and the SRH pattern, the second communication device sends a respective index which identifies the base sequence and the SRH pattern respectively.

In an example, the first communication device is a User Equipment, UE, and the second device is a Radio Base station, RBS. In another example, the first device is a RBS and the second device is a UE.

An RBS typically schedules UL transmissions to be performed by UEs. The RBS, e.g. a base station, a Node B (NB), an eNB or any suitable network node, may assign the SRH pattern to be applied by the UE and the RBS consequently adopts the corresponding receiver of the RBS when performing matched filtering or other operations necessary for channel estimation.

Figure 1D:
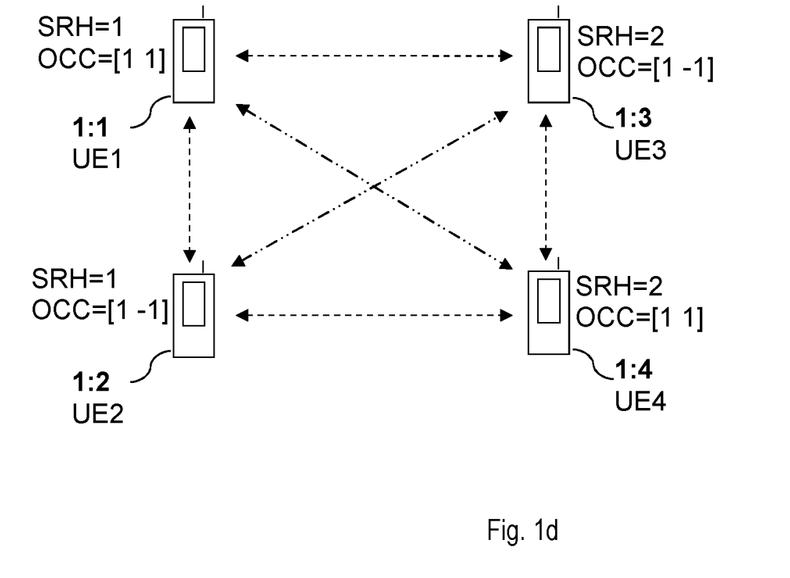
FIG. 1d illustrates four different UEs and possible interference scenarios of the UEs.

FIG. 1*d* illustrates four different UEs, UE1, UE2, UE3 and UE4. FIG. 1*d* illustrates that the interference of RSs of UE1 1:1 to the RSs of both UE2 1:2 and UE3 1:3 is reduced due to that UE2 1:2 and UE3 1:3 have different OCC than UE1 1:1. As shown, UE1 has OCC=[1 1] and SRH=1; UE2 has OCC=[1 −1] and SRH=1, UE3 has OCC=[1 −1] and SRH=2, and UE4 has OCC=[1 1] and SRH=2. UE1 and UE2 have the same SRH but due to the OCC applied to the RSs of UE1 and UE2 interference between their respective RSs is reduced. UE1 and UE3 have different SRH and different OCC reducing the interference between the RSs of the two UEs. Further UE4 1:4 has the same OCC but different SRH which reduces the interference between the RSs of UE1 and UE 4.

An implicit assumption behind SRH is that the radio channel is approximately constant over the maximum span of the circular shift of SRH. A maximum shift of only 1 subcarrier may be sufficient for a practical deployment. Another implicit assumption is that the base sequences employed for generating the reference signals have approximately impulsive auto correlation function (a condition fulfilled by the LTE standard). The examples of the OCC spanning 2 slots (i.e., 2 RSs), can be readily extended to an arbitrary number of RSs per OCC.

Figure 2A:
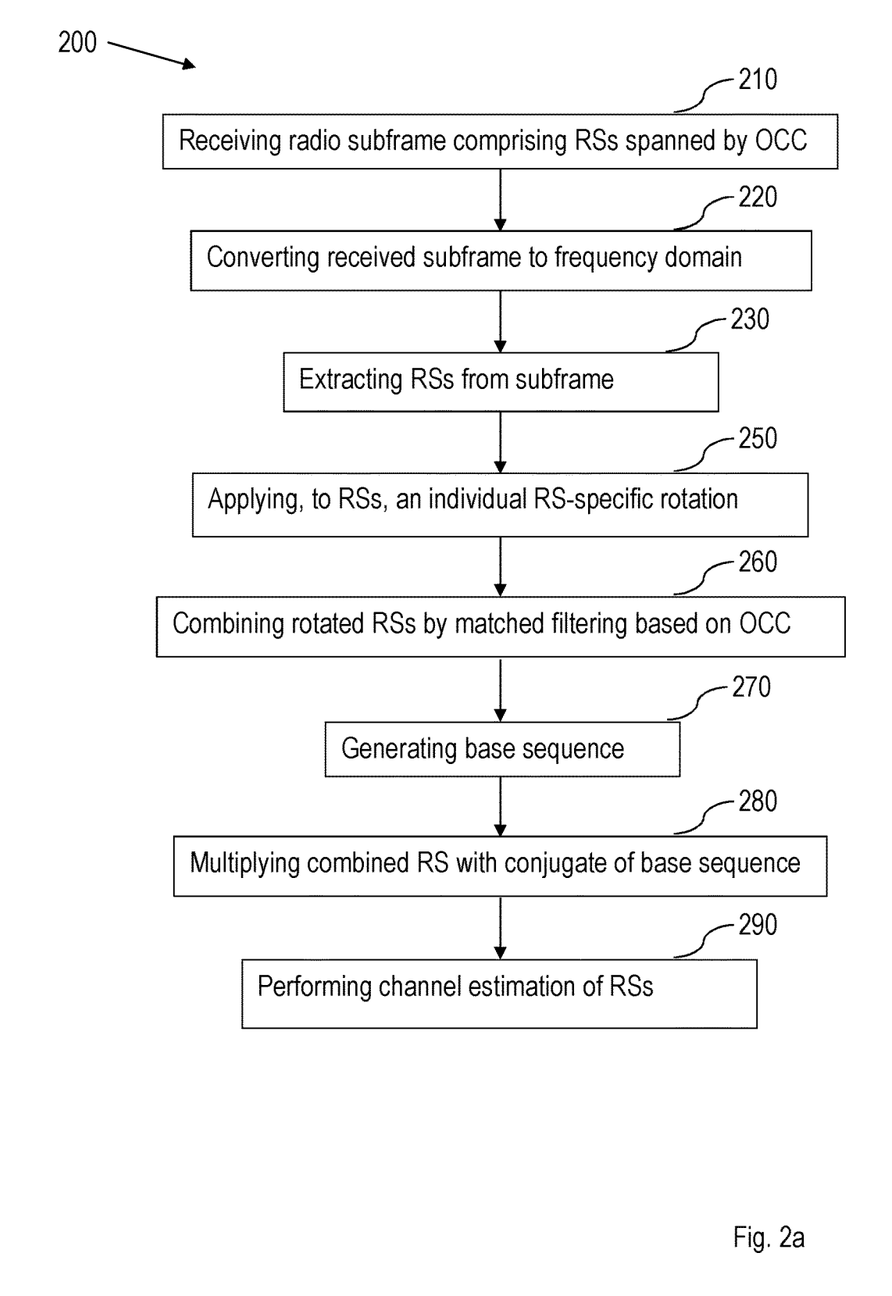
FIG. 2a is a flowchart of a method performed by a second communication device according to an exemplifying embodiment.
Figure 2B:
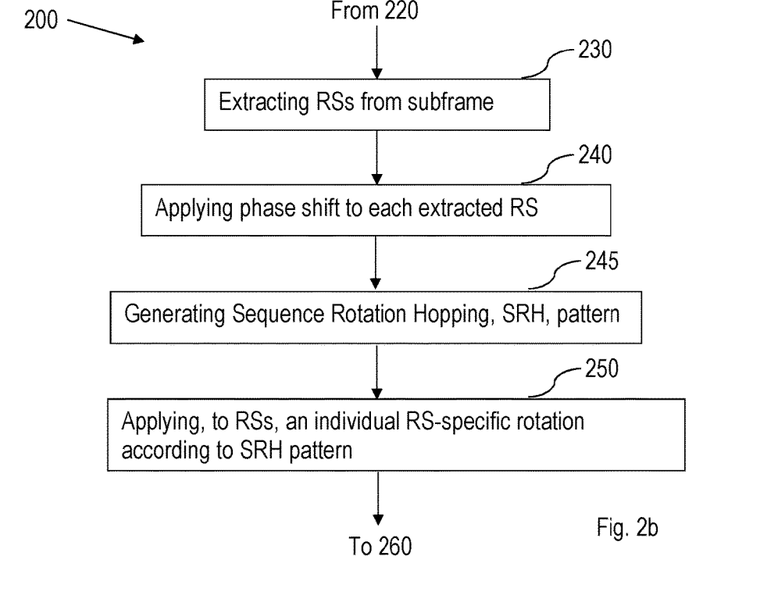
FIG. 2b is a flowchart of a method performed by a second communication device according to yet an exemplifying embodiment.
Figure 2C:
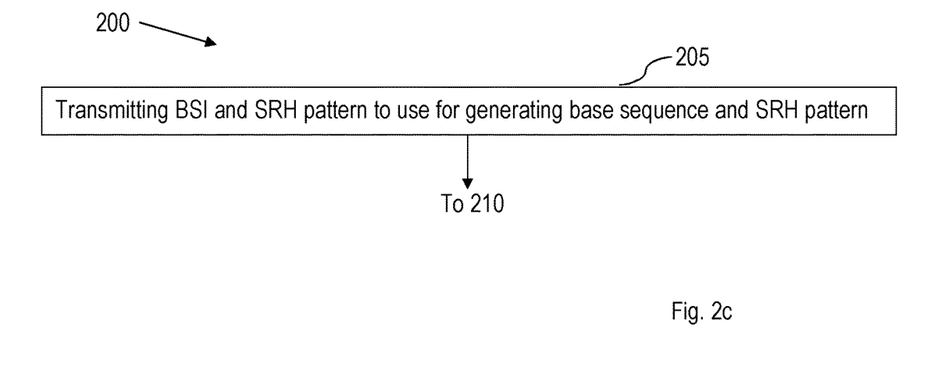
FIG. 2c is a flowchart of a method performed by a second communication device according to still an exemplifying embodiment.

Embodiments herein also relate to a method performed by a second communication device for receiving a radio transmission from a first communication device. FIGS. 2*a*, 2*b* and 2*c* are flowcharts of such a method performed by the second communication device for receiving a radio transmission from a first communication device according to exemplifying embodiments.

FIG. 2*a* illustrates the method 200 comprising receiving 210, from the first communication device, a radio subframe comprising RSs spanned by an OCC; and converting 220 the received subframe to a frequency domain. The method further comprises extracting 230 RSs from the subframe; and applying 250, to the RSs, an individual RS-specific circular rotation. The method also comprises combining 260 the rotated RSs by performing a matched filter operation based on the OCC; and generating 270 a base sequence. Still further, the method comprises multiplying 280, in the frequency domain, the combined RSs with a conjugate of the generated base sequence; and performing channel estimation 290 of the multiplied and combined RSs. Note that the received radio subframe may have been distorted by the channel and noise.

When the second communication device has extracted and/or identified the RSs of the radio subframe, the second communication device needs to perform some reverse operations with regards to the operations performed by the first communication device. The second communication device compensates for the RS-specific circular rotation of the base sequences. The RS-specific cyclic rotation is compensated by applying an opposite rotation to the one applied at the transmitter, i.e. first communication device. Hence the second device applies, to the RSs, an individual RS-specific circular rotation. Thereafter, the second communication device combines the RSs by performing a matched filter operation based on the OCC; and generates a base sequence. In order to perform channel estimation using the RSs, the second communication device multiplies the combined RSs with a conjugate of the generated base sequence in the frequency domain. Channel estimation is then performed of the multiplied and combined RSs.

The method performed by the second communication device has the same advantages as the method performed by the first communication device. Approximately the same level of interference randomisation may be achieved as with SGH, with the advantage that OCC based orthogonality may be effectively applied.

According to an embodiment, the method further comprises generating 245 a SRH pattern having a length equal to the number of RSs spanned by the OCC, wherein the amount of rotation is different for at least some of the RSs, and applying 250 the individual RS specific rotation to the RSs according to the SRH pattern.

The second communication device knows (or has information about) the SRH pattern which the first communication device applied to at least some of the base sequences. Thus in order to compensate for the RS-specific circular rotation of the base sequences, the second communication device generates the same SRH pattern as the first communication device generated and applied. Once the second communication device has generated the SRH pattern, the second communication device is enabled to compensate for the RS-specific circular rotation performed by the first communication device.

According to yet an embodiment, illustrated in FIG. 2b, the method further comprises applying 240 a (linear) phase shift to each extracted RS before applying 250 individual RS-specific circular rotation to the RSs.

In case the first communication device applied a phase shift to the rotated base sequences before multiplying the rotated base sequences with the value of OCC, compare with FIG. 1b action 150, then the second communication device should also compensate for the phase shift by applying the phase shift to each extracted 230 RS before compensating for the RS-specific circular rotation.

According to still an embodiment, illustrated in FIG. 2c, the method further comprises transmitting 205, to the first communication device, a BSI and an SRH pattern index. The indices identify the base sequence and SRH pattern respectively. The BSI and the SRH patterns index may then be used by the first device to generate the base sequence and the SRH pattern as previously described. Note that instead of sending or transmitting the BSI and the SRH pattern index, the second device may send the base sequence and the SRH pattern.

Figure 3:
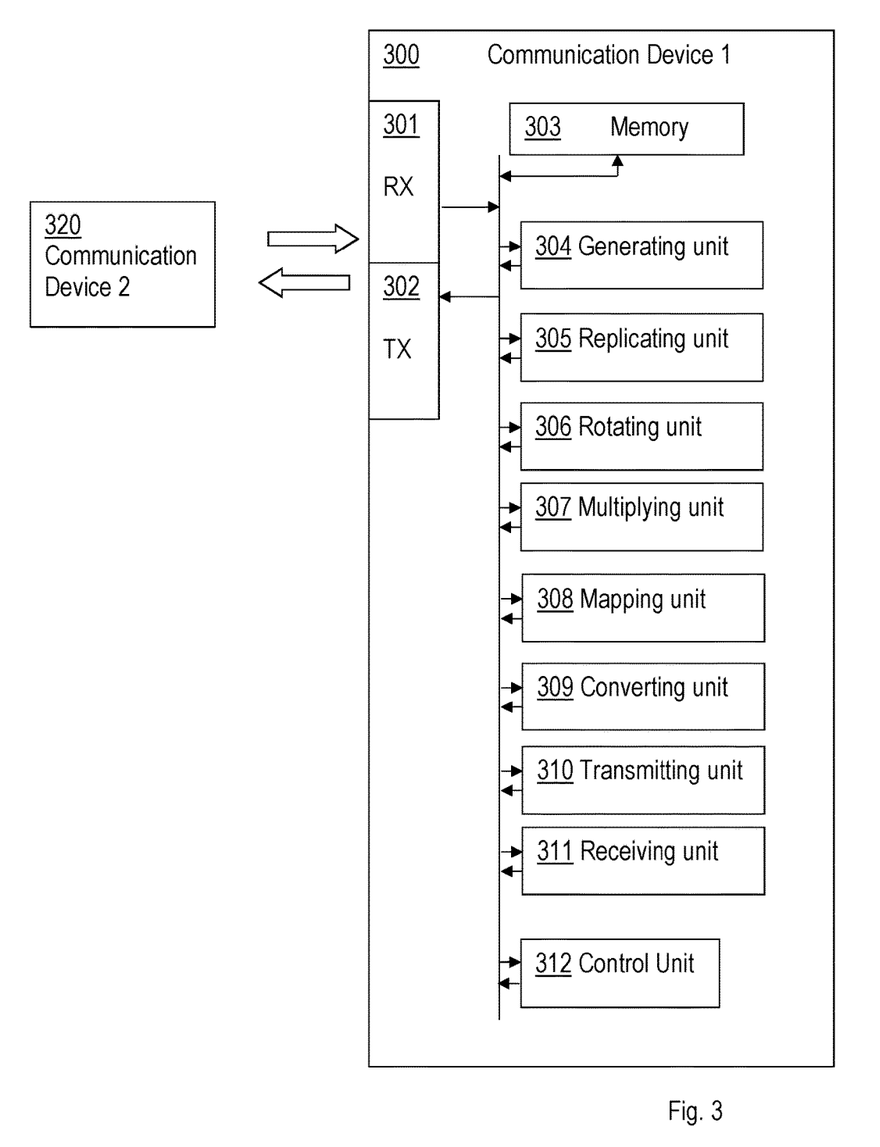
FIG. 3 is a block diagram of a first communication device adapted according to an exemplifying embodiment.

FIG. 3 illustrates an example of a first communication device 300. As shown, the device 300 comprises a generating unit 304 adapted for generating a base sequence; and a replicating unit 305 adapted for replicating the base sequence per each RS, spanned by an OCC. The first communication device further comprises a rotating unit 306 adapted for applying, to the base sequences, an individual RS-specific circular rotation, wherein each rotated base sequence corresponds to an RS; and a multiplying unit 307 adapted for multiplying each RS with respective value of the OCC. Still further, the first communication device comprises a mapping unit 308 adapted for mapping each frequency domain RS to a subframe; a converting unit 309 adapted for converting the subframe to a time domain; and a transmitting unit 310 adapted for transmitting the subframe to the second communication device.

FIG. 3 illustrates also the first communication device 300 comprising a memory 303 and a control unit 312 corresponding to a processing unit. The operations performed by the above described units 304-311 may be performed by the control or processing unit 312 based on instructions stored in the memory 303. In other words, the memory 303 comprising instructions executable by said processor 312 whereby the first communication device is operative to generate a base sequence, and replicate the base sequence per each RS spanned by an OCC. Further, when the instructions in the memory is executed by the processor, the first communication device is operative to apply, to the base sequences, an individual RS-specific circular rotation, wherein each rotated base sequence corresponds to an RS; and to multiply each RS with a respective value of the OCC; and to map each frequency domain RS to a subframe. Still further, when the instructions in the memory are executed by the processor, the first communication device is operative to convert the subframe to a time domain; and to transmit the subframe to the second communication device.

The first communication device has the same advantages as the method performed by the first communication device. Approximately the same level of interference randomisation may be achieved as with SGH, with the advantage that OCC based orthogonality may be effectively applied.

The generating unit 304 may be further adapted for generating a SRH pattern having a length equal to the number of RSs spanned by the OCC, wherein the amount of rotation is different for at least some of the RSs, wherein the rotating unit 306 is adapted for applying the RS-specific circular rotation to the base sequences according to the SRH pattern.

The rotating unit 306 may still further be adapted for applying a linear phase shift to the rotated base sequences before the multiplying unit 307 multiplies the rotated base sequences with the value of OCC.

The first communication device may further comprise a receiving unit 311 adapted for receiving, from the second communication device 320, a BSI and an SRH pattern index to use by the generating unit 304 for generating the base sequence and for generating the SRH pattern.

Embodiments herein also relate to a second communication device adapted for receiving a radio transmission from a first communication device. Such embodiments will now be described with reference to FIG. 4. The second communication device has the same technical features, objects and advantages as the method performed by the second communication device. The embodiments of the second communication device will only be described in brief in order to avoid unnecessary repetition.

Figure 4:
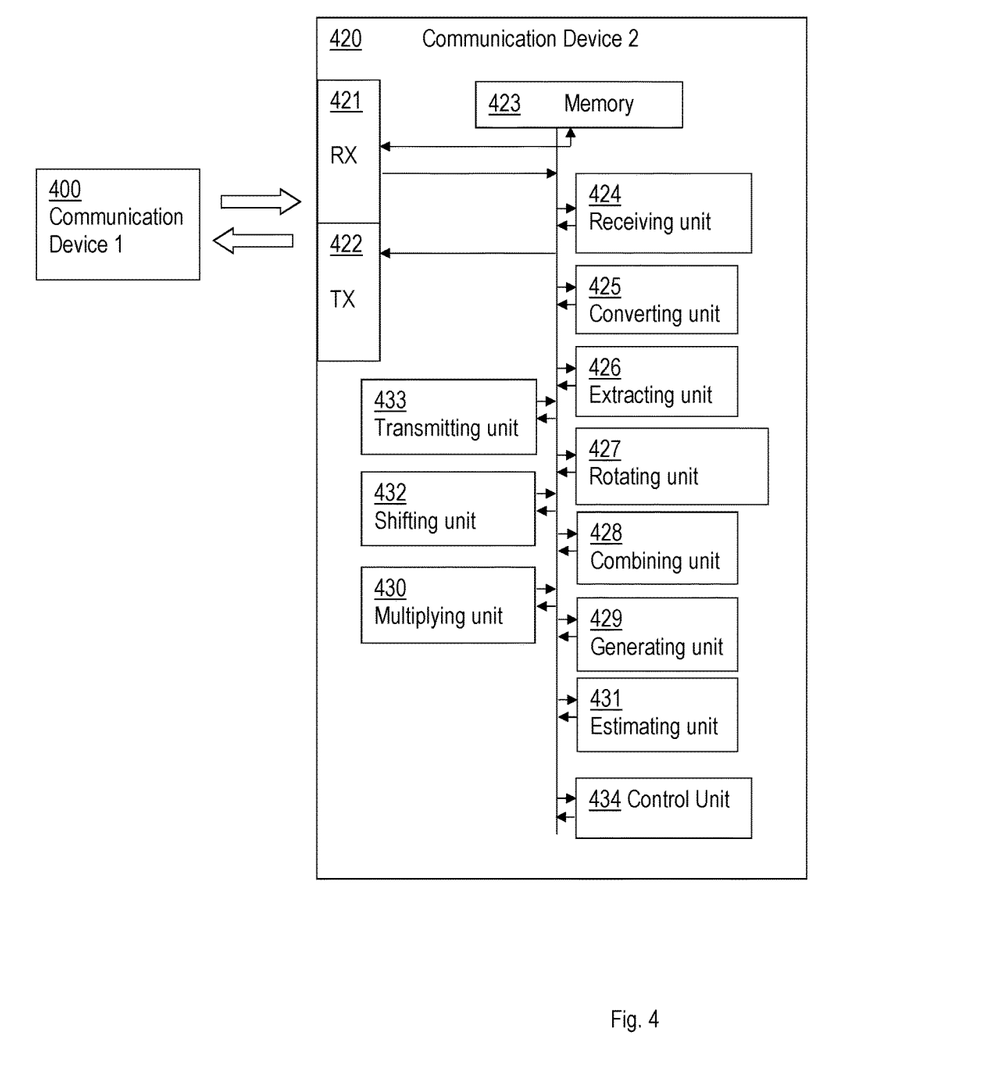
FIG. 4 is a block diagram of a second communication device adapted according to an exemplifying embodiment.

FIG. 4 illustrates the first communication device 420 comprising a receiving unit 424 adapted for receiving, from the first communication device, a radio subframe comprising RSs spanned by an OCC; and a converting unit 425 adapted for converting the received subframe to a frequency domain. The second communication device also comprises an extracting unit 426 adapted for extracting Reference Signals, RSs, from the subframe; and a rotating unit 427 adapted for applying, to the RSs, an individual RS-specific circular rotation. Further, second communication device comprises a combining unit 428 adapted for combining the rotated RSs by performing a matched filter operation based on the OCC; and a generating unit 429 adapted for generating a base sequence. The second communication device further comprises a multiplying unit 430 adapted for multiplying, in the frequency domain, the combined RSs with a conjugate of the generated base sequence; and an estimating unit 431 adapted for performing channel estimation of the multiplied and combined RSs.

The second communication device has the same advantages as the method performed by the second communication device. Approximately the same level of interference randomisation may be achieved as with SGH, with the advantage that OCC based orthogonality may be effectively applied.

FIG. 4 illustrates also the second communication device 420 comprising a memory 423 and a control unit 434 corresponding to a processing unit. In other words, the second communication device 420 comprises a processor 434 and a memory 423, said memory comprising instructions executable by said processor 434 whereby said second communication device is operative to receive, from the first communication device, a radio subframe comprising RSs spanned by an OCC; and to convert the received subframe to a frequency domain. Further, when the instructions in the memory are executed by the processor, the second communication device is operative to extract RSs from the subframe; and to apply, to the RSs, an individual RS-specific circular rotation. Still further, when the instructions in the memory are executed by the processor, the second communication device is operative to combine the rotated RSs by performing a matched filter operation based on the OCC; to generate a base sequence; to multiply, in the frequency domain, the combined RSs with a conjugate of the generated base sequence; and to perform channel estimation of the multiplied and combined RSs.

The generating unit 429 may be adapted for generating an SRH pattern having a length equal to the number of RSs spanned by the OCC, wherein the amount of rotation is different for at least some of the RSs, wherein the rotating unit 427 further is adapted for applying the individual RS-specific circular rotation to the RSs according to the SRH pattern.

In an example, the second communication device further comprises a shifting unit 432 adapted for applying a phase shift to each extracted RS before the rotating unit 427 applies the individual RS-specific circular rotation to the RSs.

According to an embodiment, the second communication device further comprises a transmitting unit 433 adapted for transmitting, to the first communication device 400, a BSI and an SRH pattern index.

In FIG. 3, the first communication device 300 is also illustrated comprising a receiving unit 301 and a transmitting unit 302. Through these two units, the first communication device 300 is adapted to communicate with other nodes and/or entities in the wireless communication network. The receiving unit 301 may comprise more than one receiving arrangement. For example, the receiving unit may be connected to both a wire and an antenna, by means of which the first communication device 300 is enabled to communicate with other nodes and/or entities in the wireless communication network. Similarly, the transmitting unit 302 may comprise more than one transmitting arrangement, which in turn are connected to both a wire and an antenna, by means of which the first communication device 300 is enabled to communicate with other nodes and/or entities in the wireless communication network.

It should be noted that FIG. 3 merely illustrates various functional units in the first communication device 300 in a logical sense. The functions in practice may be implemented using any suitable software and hardware means/circuits etc. Thus, the embodiments are generally not limited to the shown structures of the first communication device 300 and the functional units. Hence, the previously described exemplary embodiments may be realised in many ways. For example, one embodiment includes a computer-readable medium having instructions stored thereon that are executable by the control or processing unit 312 for executing the method steps in the first communication device 300. The instructions executable by the computing system and stored on the computer-readable medium perform the method steps of the first communication device 300 as set forth in the claims.

In FIG. 4, the second communication device 420 is also illustrated comprising a receiving unit 421 and a transmitting unit 422. Through these two units, the second communication device 420 is adapted to communicate with other nodes and/or entities in the wireless communication network. The receiving unit 421 may comprise more than one receiving arrangement. For example, the receiving unit may be connected to both a wire and an antenna, by means of which the second communication device 420 is enabled to communicate with other nodes and/or entities in the wireless communication network. Similarly, the transmitting unit 422 may comprise more than one transmitting arrangement, which in turn are connected to both a wire and an antenna, by means of which the second communication device 420 is enabled to communicate with other nodes and/or entities in the wireless communication network. The second communication device 420 further comprises a memory 423 for storing data. Further, the second communication device 420 is illustrated comprising a control or processing unit 434 which in turns is connected to the different units 424-433. It shall be pointed out that this is merely an illustrative example and the second communication device 420 may comprise more, less or other units or modules which execute the functions of the second communication device 420 in the same manner as the units illustrated in FIG. 4.

It should be noted that FIG. 4 merely illustrates various functional units in the second communication device 420 in a logical sense. The functions in practice may be implemented using any suitable software and hardware means/circuits etc. Thus, the embodiments are generally not limited to the shown structures of the second communication device 420 and the functional units. Hence, the previously described exemplary embodiments may be realised in many ways. For example, one embodiment includes a computer-readable medium having instructions stored thereon that are executable by the control or processing unit 434 for executing the method steps in the second communication device 420. The instructions executable by the computing system and stored on the computer-readable medium perform the method steps of the second communication device 420 as set forth in the claims.

Figure 5:
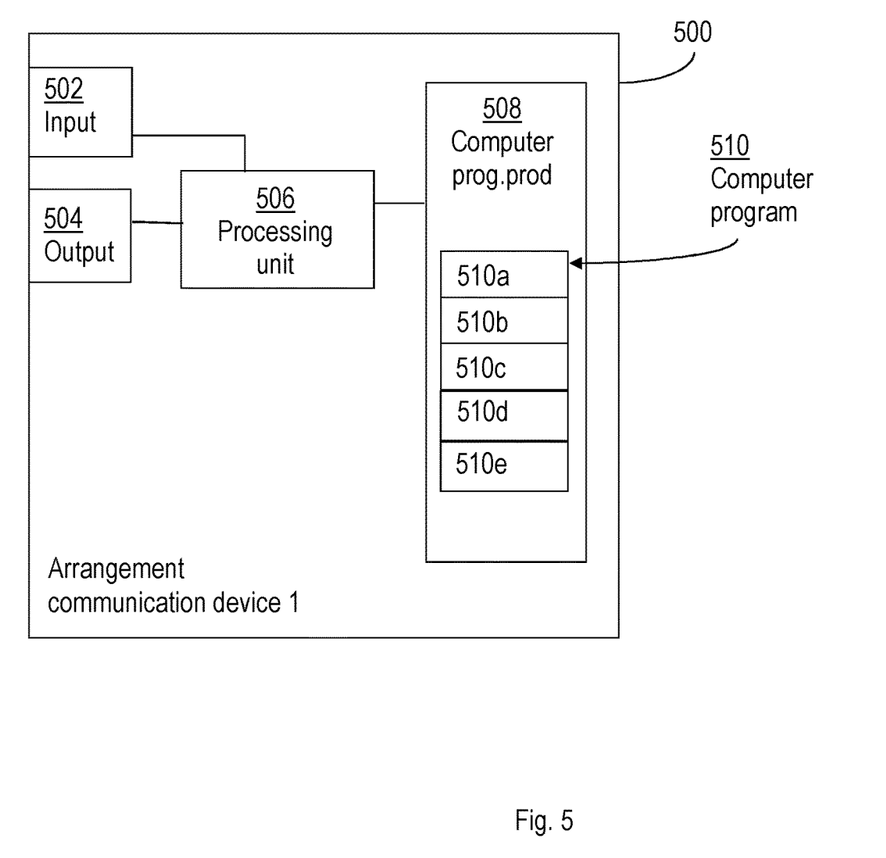
FIG. 5 is a block diagram of an arrangement in a first communication device according to an exemplifying embodiment.

FIG. 5 schematically shows an embodiment of a first communication device 500. Comprised in the first communication device 500 are here a processing unit 506, e.g. with a DSP (Digital Signal Processor). The processing unit 506 may be a single unit or a plurality of units to perform different actions of procedures described herein. The first communication device 500 may also comprise an input unit 502 for receiving signals from other entities, and an output unit 504 for providing signal(s) to other entities. The input unit and the output unit may be arranged as an integrated entity or as illustrated in the example of FIG. 3, as one or more interfaces 301/302.

Furthermore, the first communication device 500 comprises at least one computer program product 508 in the form of a non-volatile memory, e.g. an EEPROM (Electrically Erasable Programmable Read-Only Memory), a flash memory and a hard drive. The computer program product 508 comprises a computer program 510, which comprises code means, which when executed in the processing unit 506 in the first communication device 500 causes the first communication device 500 to perform the actions e.g. of the procedure described earlier in conjunction with FIGS. 1*a*-1*c*.

The computer program 510 may be configured as a computer program code structured in computer program modules 510*a*-510*e*. Hence, in an exemplifying embodiment, the code means in the computer program of the first communication device 500 comprises a generating unit, or module, for generating a base sequence. The computer program further comprises a replicating unit, or module, for replicating the base sequence per each RS spanned by an OCC. The computer program further comprises a rotating unit, or module, for applying, to the base sequences, an individual RS-specific circular rotation, wherein each rotated base sequence corresponds to an RS. The computer program further comprises a multiplying unit, or module, for multiplying each RS with respective value of the OCC; and a mapping unit, or module, for mapping each frequency domain RS to a subframe. Still further, the computer program comprises a converting unit, or module, for converting the subframe to a time domain; and a transmitting unit, or module, for transmitting the subframe to the second communication device.

The computer program modules could essentially perform the actions of the flow illustrated in FIGS. 1*a*-1*c*, to emulate the first communication device 500. In other words, when the different computer program modules are executed in the processing unit 506, they may correspond to the units 304-311 of FIG. 3.

Figure 6:
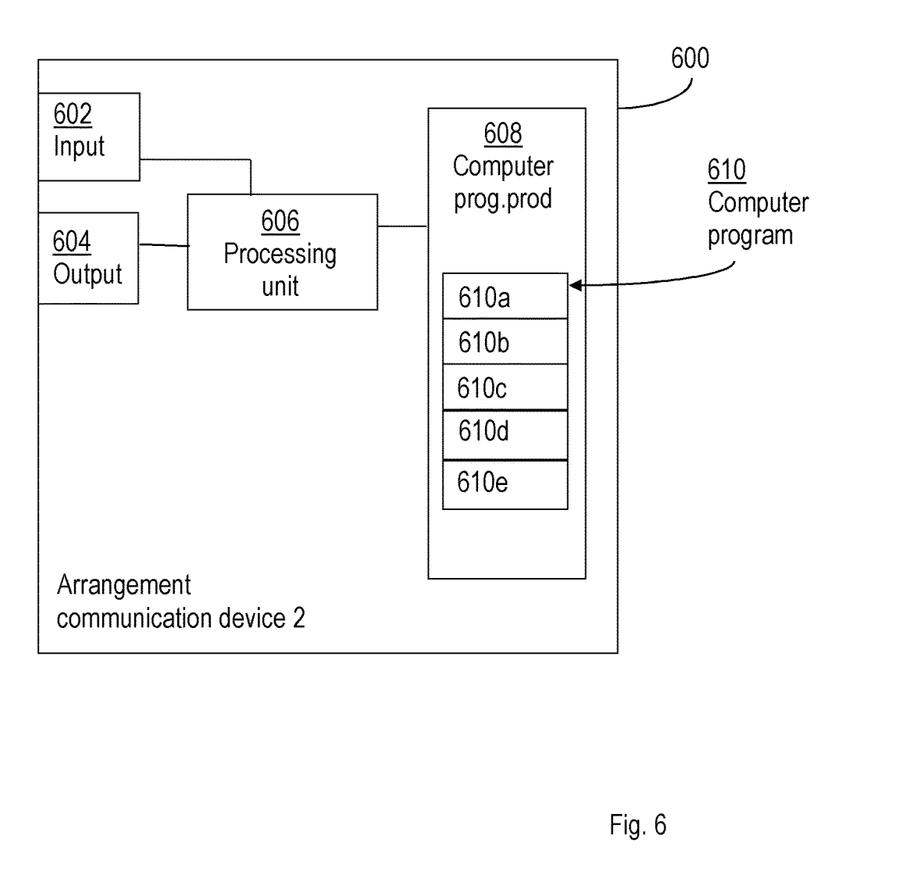
FIG. 6 is a block diagram of an arrangement in a second communication device according to an exemplifying embodiment.

FIG. 6 schematically shows an embodiment of a second communication device 600. Comprised in the second communication device 600 are here a processing unit 606, e.g. with a DSP (Digital Signal Processor). The processing unit 606 may be a single unit or a plurality of units to perform different actions of procedures described herein. The second communication device 600 may also comprise an input unit 602 for receiving signals from other entities, and an output unit 604 for providing signal(s) to other entities. The input unit and the output unit may be arranged as an integrated entity or as illustrated in the example of FIG. 4, as one or more interfaces 421/422.

Furthermore, the second communication device 600 comprises at least one computer program product 608 in the form of a non-volatile memory, e.g. an EEPROM (Electrically Erasable Programmable Read-Only Memory), a flash memory and a hard drive. The computer program product 608 comprises a computer program 610, which comprises code means, which when executed in the processing unit 606 in the second communication device 600 causes the second communication device 600 to perform the actions e.g. of the procedure described earlier in conjunction with FIGS. 2*a*-2*c*.

The computer program 610 may be configured as a computer program code structured in computer program modules 610*a*-610*e*. Hence, in an exemplifying embodiment, the code means in the computer program of the second communication device 600 comprises a receiving unit, or module, for receiving, from the first communication device, a radio subframe comprising RSs spanned by an OCC. The computer program further comprises a converting unit, or module, for converting the received subframe to a frequency domain; and an extracting unit, or module, for extracting RSs from the subframe. The computer program further comprises a rotating unit, or module, for applying, to the RSs, an individual RS-specific circular rotation. The computer program further comprises a combining unit, or module, for combining the rotated RSs by performing a matched filter operation based on the OCC. Still further, the computer program comprises a generating unit, or module, for generating a base sequence; a multiplying unit, or module, for multiplying, in the frequency domain, the combined RSs with a conjugate of the generated base sequence; and an estimating unit, or module for performing channel estimation of the multiplied and combined RSs.

The computer program modules could essentially perform the actions of the flow illustrated in FIGS. 2*a*-2*c*, to emulate the second communication device 600. In other words, when the different computer program modules are executed in the processing unit 606, they may correspond to the units 424-433 of FIG. 4.

Although the code means in the respective embodiments disclosed above in conjunction with FIGS. 3 and 4 are implemented as computer program modules which when executed in the respective processing unit causes the first communication device and the second communication device respectively to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the first communication device and the second communication device respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Figure 7A:
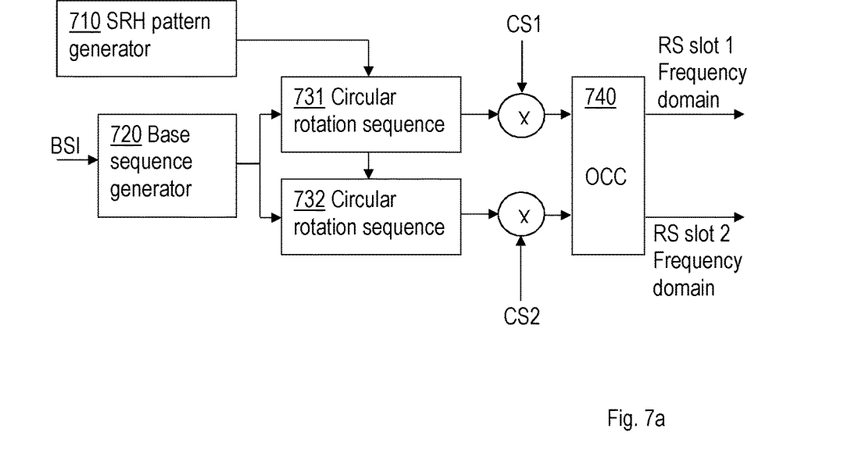
FIG. 7a is an illustration of an RS generator with Sequence Rotation Hopping, SRH, at e.g. the first communication device.

FIG. 7*a* is an illustration of an exemplary RS generator with Sequence Rotation Hopping, SRH, at e.g. the first communication device.

In FIG. 7*a*, a base sequence is generated in a base sequence generator 720 from a BSI. In this example, the OCC is of order 2 and the base sequence is replicated so that there are two identical base sequences. An SRH pattern generator 710 generates an SRH pattern having a length that is equal to the number of RSs spanned by the OCC, i.e. 2 in this example. The amount of shift is different for at least some of the RSs.

The SRH pattern and the base sequences are fed to two rotation entities called circular rotation sequence and denoted 731 and 732 in FIG. 7a, wherein the RS-specific circular rotation is applied to each of the base sequences according to the SRH pattern. Then the two (now different) RSs are each subjected to a phase shift by being fed to CS1 and CS2. The phase shift may be different for the different RSs, resulting in the RSs differing even further. Thereafter, the RSs are fed to an OCC unit 740 wherein the phase shifted and rotated base sequences, i.e. the RSs, are multiplied with the value of the OCC corresponding to each RS and the RSs are thus produced, or converted, to the frequency domain. Then the RSs are mapped to a subframe and transmitted.

Figure 7B:
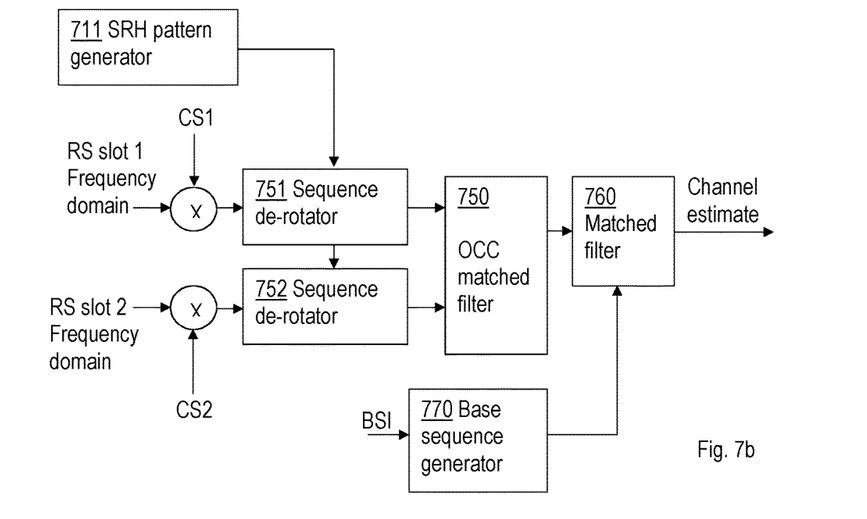
FIG. 7b is an illustration of a channel estimator with SRH at e.g. the second communication device.

FIG. 7b is an illustration of an exemplary channel estimator with SRH at e.g. the second communication device.

In FIG. 7b, a radio subframe is received and converted to the frequency domain. The signal corresponding to each RS is extracted. The phase shift is first compensated for by the CS1 and CS2 and the two RSs are fed to a respective sequence de-rotator 751 and 752. In an SRH pattern generator 711, an SRH pattern is generated having a length equal to the number of RSs spanned by the OCC, i.e. 2 in this example. The amount of shift is different for at least some of the RS. The generated SRH pattern is also fed to the sequence de-rotators 751 and 752. The RS-specific circular rotation is thus compensated for by applying the opposite circular rotation in the frequency domain compared to the first communication device.

Thereafter, each respective RS is fed to an OCC matched filter 750 wherein the RSs are combined by performing a matched filter operation based on the OCC which were applied by the first communication device. Also in the second communication device, the base sequence is generated by a base sequence generator 770 based on the BSI and the base sequence and the result of the matched filter operation based on the OCC are fed to a matched filter 760, wherein the combined RSs are multiplied with the conjugate of the base sequence. The signal is also converted to the time domain in order to perform a channel estimation in the time domain.

Looking at FIG. 1d together with FIGS. 7a and 7b, assume that a UE2 1:2 applies the same SRH pattern as UE1 in FIG. 7a, but a different OCC code than UE1 1:1. Under the above assumptions, the RS from UE2 are completely cancelled by the OCC at the receiver in FIG. 7b, with the exception of some band-edge effect. If the maximum subcarriers shift is small compared to the RS bandwidth, such edge effects might be negligible.

Assume that an interfering UE3 1:3 applies a different SRH pattern than UE1, and an arbitrary OCC code. The circular shifts produce phase rotations of the time domain signal corresponding to each RS. The phase rotation speed is in general different for each RS belonging to the same OCC, and it is uncompensated prior to OCC combining at the receiver. This results in incoherent combination of the RSs at the receiver, resulting in robust performance in presence of interference from UE3.

The flexibility from SRH may be exploited in different ways during network deployment and scheduling. In one example, UEs are clustered in mutually orthogonal sets (UEs with same SRH but different OCC) and mutually semi-orthogonal sets (UEs with different SRH).

In an example, in a heterogeneous deployment, UEs connected to a macro RBS are assigned a certain SRH and UEs connected to low power RBSs are associated another SRH, but alternating OCC values for adjacent cells, i.e. neighbouring RBSs. By doing so, all low-power-UEs RS are semi-orthogonal to the macro-UEs RS, while low-power-UEs are orthogonal to every other low-power-UE.

In another example, an RBS employs the same SRH for all UEs that it serves and it aims at inter-UE orthogonality by OCC or CS. Neighbouring cells/RBSs are however semi-orthogonal by employing a different SRH.

In a multi-cell deployment, SRH values may be coordinated, e.g. by signalling them over standardised interfaces (e.g. X2) or proprietary inter-node interfaces.

In LTE, for Multiple Input Multiple Output, MIMO, capable UEs, OCC may be exploited for inter-layer orthogonality within the same UE (e.g. for MIMO transmission). The embodiments described herein may be applied also to provide inter-layer interference randomisation.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a first communication device for performing a radio transmission to a second communication device, the method comprising:
generating a base sequence,
replicating the base sequence per each Reference Signal, RS, spanned by an Orthogonal Cover Code, OCC,
generating a Sequence Rotation Hopping, SRH, pattern having a length equal to a number of RSs spanned by the OCC,
applying, to each replicated base sequence, an individual RS-specific circular rotation according to the generated SRH pattern, wherein each rotated base sequence corresponds to an RS from the RSs spanned by the OCC,
multiplying each rotated base sequence with a respective value of the OCC to produce a frequency domain RS corresponding to each rotated base sequence,
mapping each frequency domain RS to a subframe,
converting the subframe to a time domain, and
transmitting the subframe to the second communication device.

2. A method according to claim 1, wherein an amount of rotation is different for at least some of the RSs spanned by the OCC.

3. A method according to claim 1, further comprising applying a linear phase shift to the rotated base sequences before multiplying the rotated base sequences with the respective value of OCC.

4. A method according to claim 2, further comprising receiving, from the second communication device, a Base Sequence Index, BSI, and an SRH pattern index for generating the base sequence and the SRH pattern.

5. A method performed by a second communication device for receiving a radio transmission from a first communication device, the method comprising:
receiving, from the first communication device, a radio subframe comprising reference signals, RSs, spanned by an Orthogonal Cover Code, OCC,
converting the received radio subframe to a frequency domain, extracting the RSs spanned by the OCC, from the radio subframe,
generating a Sequence Rotation Hopping, SRH, pattern having a length equal to a number of RSs spanned by the OCC,
applying, to each extracted RS spanned by the OCC, an individual RS-specific circular rotation according to the generated SRH pattern,
combining the rotated RSs by performing a matched filter operation based on the OCC,
generating a base sequence,
multiplying, in the frequency domain, the combined RSs with a conjugate of the generated base sequence, and
performing channel estimation of the multiplied and combined RSs.

6. A method according to claim 5, wherein an amount of rotation is different for at least some of the extracted RSs spanned by the OCC.

7. A method according to claim 5, further comprising applying a phase shift to each extracted RS spanned by the OCC before applying the individual RS-specific circular rotation to the extracted RSs spanned by the OCC.

8. A method according to claim 5, further comprising transmitting, to the first communication device, a Base Sequence Index, BSI, and an SRH pattern index.

9. A first communication device for performing a radio transmission to a second communication device, the first communication device comprising a processor configured to:
generate a base sequence,
replicate the base sequence per each Reference Signal, RS, spanned by an Orthogonal Cover Code, OCC,
generate a Sequence Rotation Hopping, SRH, pattern having a length equal to a number of RSs spanned by the OCC,
apply to each replicated base sequence, an individual RS-specific circular rotation, according to the generated SRH pattern, wherein each rotated base sequence corresponds to an RS from the RSs spanned by the OCC,
multiply each rotated base sequence with a respective value of the OCC to produce a frequency domain RS corresponding to each rotated base sequence,
map each frequency domain RS to a subframe,
convert the subframe to a time domain, and
transmit the subframe to the second communication device.

10. A first communication device according to claim 9, wherein
an amount of rotation is different for at least some of the RSs spanned by the OCC.

11. A first communication device according to claim 9, wherein the processor is further configured to apply a linear phase shift to the rotated base sequences before multiplying the rotated base sequences with the respective value of OCC.

12. A first communication device according to claim 10, wherein the processor is further configured to receive, from the second communication device, a Base Sequence Index, BSI, and an SRH pattern index to generate the base sequence and the SRH pattern.

13. A second communication device for receiving a radio transmission from a first communication device, the second communication device comprising a processor configured to:
receive, from the first communication device, a radio subframe comprising reference signals, RSs, spanned by an Orthogonal Cover Code, OCC,
convert the received radio subframe to a frequency domain,
extract the RSs spanned by the OCC, from the radio subframe,
generate a Sequence Rotation Hopping, SRH, pattern having a length equal to a number of RSs spanned by the OCC,
apply to each extracted RS spanned by the OCC, an individual RS-specific circular rotation according to the generated SRH pattern,
combine the rotated RSs by performing a matched filter operation based on the OCC,
generate a base sequence,
multiply, in the frequency domain, the combined RSs with a conjugate of the generated base sequence, and
perform channel estimation of the multiplied and combined RSs.

14. A second communication device according to claim 13, wherein
an amount of rotation is different for at least some of the extracted RSs spanned by the OCC.

15. A second communication device according to claim 13, wherein the processor is further configured to apply a phase shift to each extracted RS spanned by the OCC before applying the individual RS-specific circular rotation to the extracted RSs spanned by the OCC.

16. A second communication device according claim 13, wherein the processor is further configured to transmit to the first communication device, a Base Sequence Index, BSI, and an SRH pattern index.

* * * * *